UNITED STATES PATENT OFFICE.

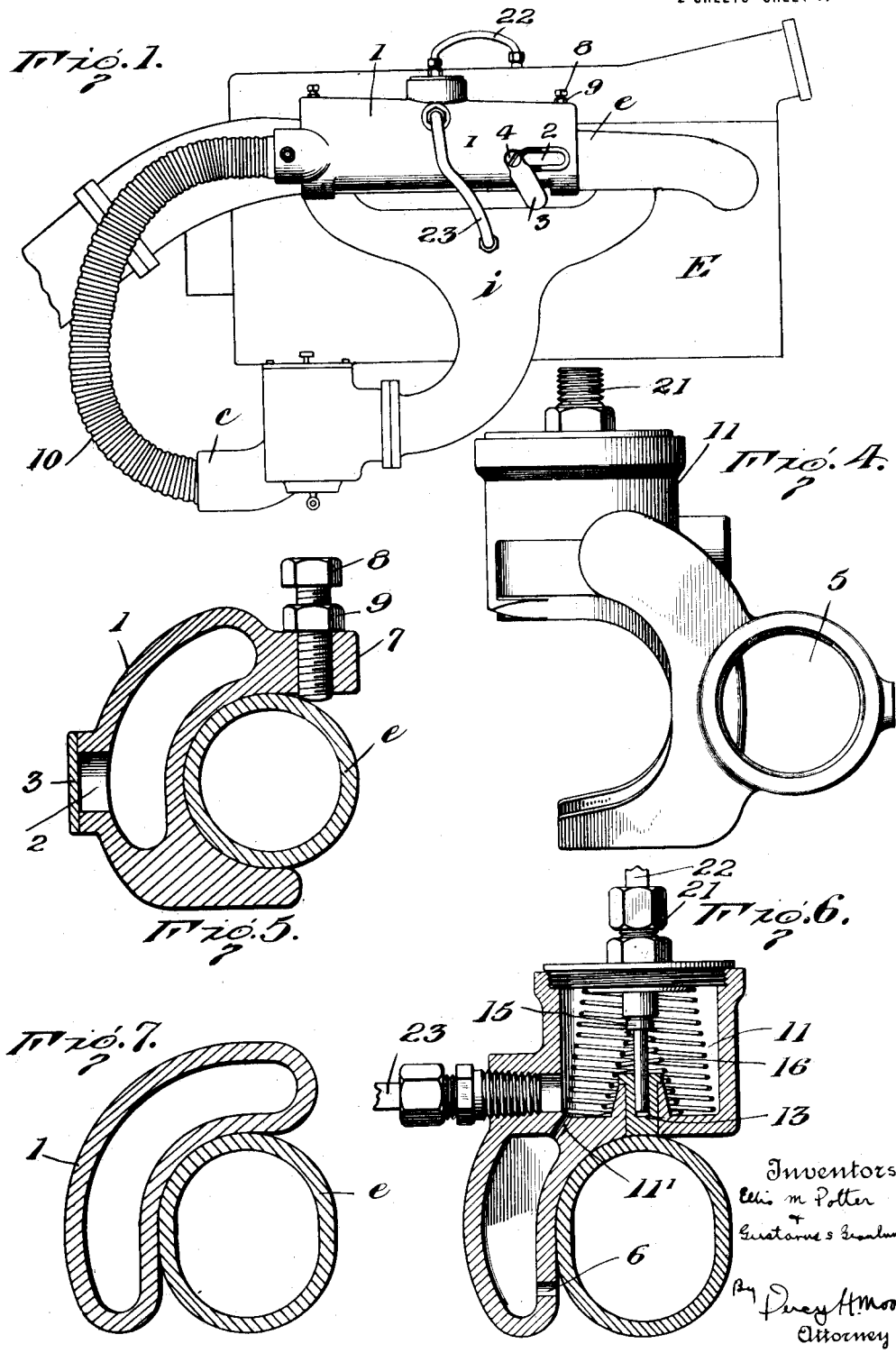

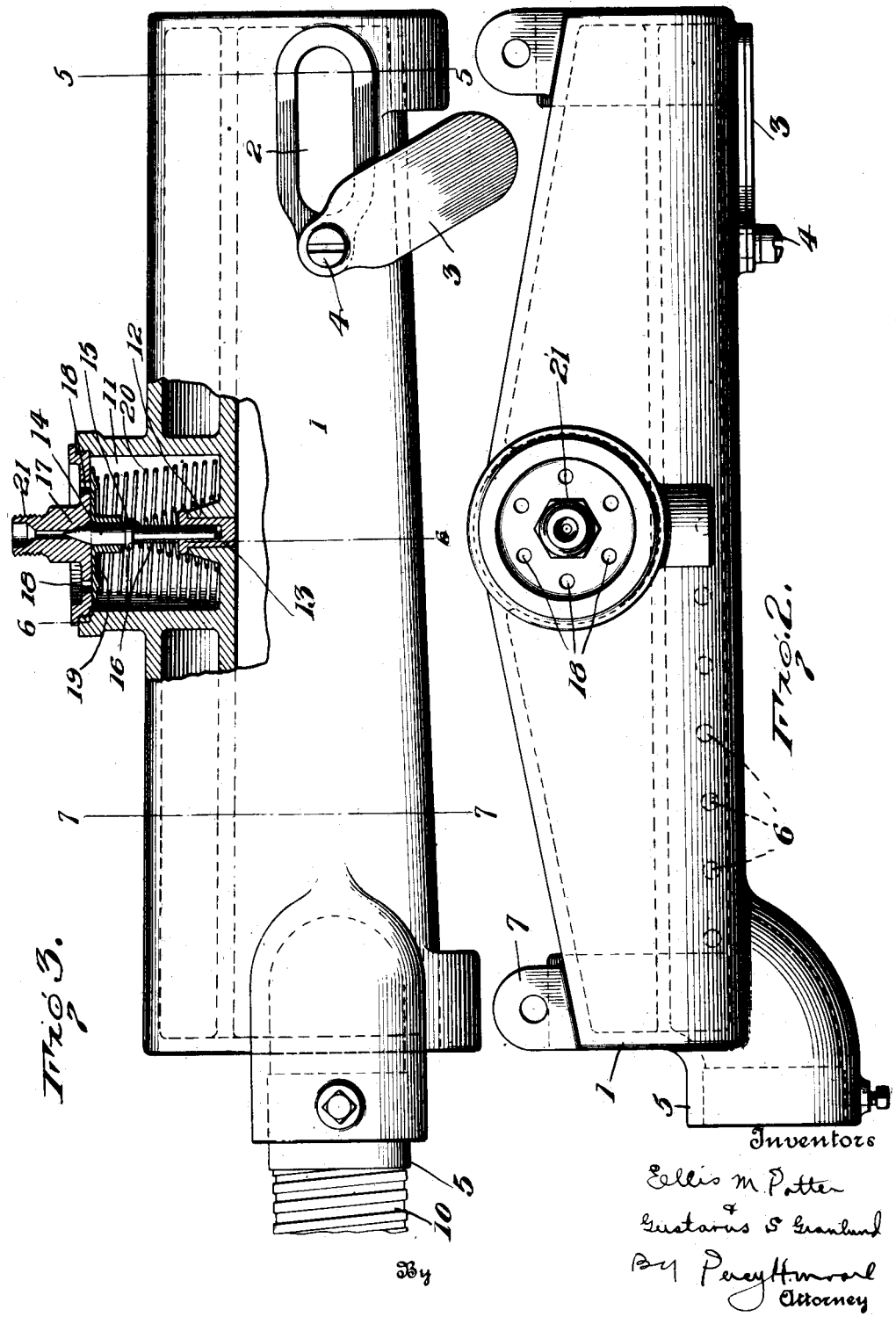

ELLIS M. POTTER, OF NEW YORK, N. Y., AND GUSTAVUS S. GRANLUND, OF NEWARK, NEW JERSEY; SAID GRANLUND ASSIGNOR TO SAID POTTER.

INTERNAL-COMBUSTION-ENGINE ATTACHMENT.

1,372,451. Specification of Letters Patent. Patented Mar. 22, 1921.

Application filed November 29, 1919. Serial No. 341,461.

*To all whom it may concern:*

Be it known that we, ELLIS M. POTTER and GUSTAVUS S. GRANLUND, citizens of the United States of America, respectively, residing, ELLIS M. POTTER at 840 West End Ave., New York city, N. Y., and GUSTAVUS S. GRANLUND at 75 Clinton Ave., Newark, New Jersey, have invented a new and useful Improvement in Internal - Combustion-Engine Attachments, of which the following is a specification.

This invention relates to improvements in internal combustion engine attachments, and has for its dominant object to provide a novel combined air heater and carbon preventing or removing device whereby the air employed by the ordinary carbureter or other charge forming device of an engine will be brought to maximum thermal efficiency, thus lending to the power of the explosive charge, and also, to supply steam to the engine cylinders in quantities sufficient to absolutely remove the carbon therefrom.

It is also an object of our invention to provide a combination device of the character mentioned, with a view to compactness, and which can be readily attached to any engine of the design now prevalent in the motor driven vehicle art without alteration to any part thereof or interference with functioning of an engine so provided or any of its accessories.

Another important characteristic feature of the invention resides in the novel construction of the steam generating means of the improved device, the same being capable of operation to generate steam in quantities which when injected into the cylinders of an engine, will serve to fully remove any carbon from the same, the steam generating means being heated by contact with the heated walls of the engine exhaust manifold.

In order that the invention and the manner of its application and operation may be fully understood by workers skilled in the art, we have in the accompanying illustrative drawings and in the following detailed description predicated thereon, set out one embodiment of the same.

In these drawings:

Figure 1 is a side elevation of an engine provided with our improved device;

Fig. 2 is a top plan view of the device;

Fig. 3 is a side elevation of the same, a part thereof being broken away and shown in section;

Fig. 4 is an end view of the device;

Fig. 5 is a vertical transverse section taken on the line 5—5 of Fig. 3;

Fig. 6 is a similar view taken on the line 6—6 of Fig. 3; and

Fig. 7 is a transverse section taken on the line 7—7 of Fig. 3.

Having more particular reference to the drawings in connection with which like reference characters will designate corresponding parts, our invention may be stated to consist of an air heater casing 1 shaped on its inner face to snugly engage over the exhaust manifold $e$ of an internal combustion engine E provided with the same, as shown in the Figs. 4, 5 and 6, and having an air inlet port 2 on one end thereof adapted to be controlled or regulated by a plate valve 3 pivoted to said casing at 4 in order that the passage of fresh air into, through and from the heater by way of an outlet port 5 in the opposite end of casing may be varied such as conditions or preference may dictate. Other openings 6 are formed in that wall of the heater casing adjacent the exhaust manifold $e$ so as to permit the heated air proximity to the heated exhaust manifold $e$ to be also drawn into the casing, and in this way, materially expedite the heating of air taken in by way of the casing inlet port.

In order that the heater casing may be secured to the exhaust manifold $e$, lateral lugs 7 are formed integral with the upper marginal portion of the casing extremities and have set screws 8 turned into engagement therewith, the inner ends of which engage adjacent parts of the manifold $e$ and thus clamp the casing in position; these set-screws being locked in their adjusted positions by lock-nuts 9 engaging the same. Hence, the heater may be quickly attached or detached to or from the exhaust manifold of the prevalent types of internal combustion engines, and also, insured against displacement, such as might be caused by vibration of the engine parts.

Connection between the port 5 of the air heater and the carbureter C of the engine E is effected by means of a flexible conduit 10, one end of which is engaged in said outlet port 5 while its other end is engaged in the air intake of the carbureter C.

To accommodate the steam generating means forming a part of our invention, the intermediate portion of the air heater casing is enlarged as shown in the Fig. 2 and receives therein a cup or like receptacle 11 communicating with the casing 1 by means of a by-pass 11′, the mouth of said cup being internally screw threaded while the bottom of the same is formed with a pocket 12 receiving a bushing 13 therein, which in turn, is adapted to slidably receive the stem of a needle valve 14, said valve carrying an annular shoulder 15 against which one end of a coiled spring 16 bears, the remaining portion of the spring engaging over said pocket 12, said valve being received in a centrally located conical seat formed in a head 17, also screw-threaded and turned into engagement with the mouth of the cup 11. Air inlet openings 18 are formed in said head 17 and are normally closed by means of a disk valve 19 slidable on the needle valve 14 and normally held against the inner face of said head by means of a coiled spring 20 positioned in the cup 11. A screw-threaded nipple 21 is extended from the head 17 and communicates with the seat for the needle valve 14 whereby connection between said steam generating means and the water jacket of the engine E by means of a conduit 22 can be effected; it being understood that the conduit is tapped into the water jacket in a suitable manner. A second screw-threaded opening is formed in the lower portion of the cup 11 and obviously, serves to permit the establishing of communication between the engine intake manifold i and said cup 11, a conduit 23 engaging in said opening at one end and in the intake manifold i of the engine E at its other end.

In operation of the improved device, air is drawn into the air heater casing by reason of the suction occurring at the air intake port of the carbureter C, causing the same to be heated due to exchange of heat between the exhaust manifold e and said casing, whereupon said air is introduced into the carbureter C by way of the conduit 10. The flow of air into said casing 1 can be regulated by the pivoted plate 3. Simultaneously with the heating of air in the casing 1 (the engine operating) a suction is created in the intake manifold i which by reason of its connection with the cup 11 will cause valve 19 to be moved downwardly on the valve 14 against the tension of spring 20, whereupon the same will engage the annular shoulder 15 and thus, effect unseating of the needle valve 14 against the tension of spring 16, thereby allowing a small quantity of water to drop into the now heated cup 11. Upon contact of the water with the heated portions of the cup 11, steam will be generated which, in turn, will pass through conduit 23 into the intake manifold 1 and thus into the engine cylinders, by means of the suction of the latter.

As the speed of the engine increases so will the supply of air and steam to the intake manifold increase, and in consequence, proper functioning of the invention will be insured.

If dirt or sediment should lodge on the seat of needle valve 14, it would cause a leakage of water into the cup 11 from whence it would flow when the engine is idle into the manifold 1 and into the carbureter. This would make difficult starting and to overcome this we have placed the overflow hole 11′ so that any water in the cup 11 will drain off into the casing 1 whence it will flow through holes 6 onto the ground.

It will be appreciated that our improved device may be so combined with the exhaust manifold E as to form an integral part thereof. It will be also appreciated that the cup 11 can be built into the exhaust manifold E as an integral part thereof.

Manifestly, the construction shown, is capable of considerable modification, and such modification as is within the spirit of our claim, we consider within the spirit of our invention.

What we claim is:

In combination with an internal combustion engine, a casing shaped in cross section to snugly engage a portion of the exhaust manifold of an engine and be held against undue disengagement therefrom, provided with air inlet and outlet means, one portion of the casing adjacent the exhaust manifold being formed with smaller inlet openings, said outlet means being connected to the charge forming device of the engine, a cup carried on the upper side of the intermediate portion of the casing communicating with the latter, a head for said cup having air openings therein and provided with a valve seat, a needle valve slidable in said cup and engageable on said valve seat, water supply means connected to said head communicating with the valve seat, a spring pressed disk valve in said cup slidable on the needle valve stem and adapted to actuate the same upon predetermined movement thereof, said disk valve normally closing the air openings in the head, and means for effecting connection between said cup and the engine intake manifold whereby to cause operation of said disk valve by the suction occurring in the intake manifold.

In testimony whereof we, ELLIS M. POTTER and GUSTAVUS S. GRANLUND, have signed our names to this specification in the presence of two subscribing witnesses this fifth day of November, 1919.

ELLIS M. POTTER.
GUSTAVUS S. GRANLUND.

Witnesses:
   FRANCIS NEIDER,
   SAMUEL MAY.